United States Patent [19]

Kaman et al.

[11] 4,259,718

[45] Mar. 31, 1981

[54] PROCESSOR FOR A DATA PROCESSING SYSTEM

[75] Inventors: Charles H. Kaman, Newton Highlands; Daniel T. Sullivan, Bolton; James F. O'Loughlin, Westford; Craig Mudge, Lincoln, all of Mass.

[73] Assignee: Digital Equipment Corporation, Maynard, Mass.

[21] Appl. No.: 776,331

[22] Filed: Mar. 10, 1977

[51] Int. Cl.³ .............................................. G06F 13/00
[52] U.S. Cl. ...................................................... 364/200
[58] Field of Search ... 364/200 MS File, 900 MS File

[56] References Cited

U.S. PATENT DOCUMENTS

| 3,614,740 | 10/1971 | Pelagi et al. | 364/200 |
| 3,614,741 | 10/1971 | McFarland, Jr. et al. | 364/200 |
| 3,710,324 | 1/1973 | Cohen et al. | 364/200 |
| 3,735,363 | 5/1973 | Beers et al. | 364/200 |
| 3,953,833 | 4/1976 | Shapiro | 364/200 |
| 3,978,456 | 8/1976 | Moran | 364/200 |
| 4,050,058 | 9/1977 | Garlic | 364/200 |
| 4,145,736 | 3/1979 | Yamada et al. | 364/200 |

OTHER PUBLICATIONS

System/360 Model 40, IBM Field Engineering Handbook, 4th Ed.; 09001970.

Primary Examiner—Gareth D. Shaw
Assistant Examiner—Thomas M. Heckler
Attorney, Agent, or Firm—Arthur W. Fisher; Maureen L. Stretch

[57] ABSTRACT

A processor in a data processing system comprising a plurality of units for performing various functions and at least one data bus interconnecting the units for transferring information therebetween. The processor also includes a control store for storing microprogrammed instructions which are directly coupled to the units of the processor for controlling the operation thereof. Certain ones of the microprogrammed processor instructions, which are utilized in the transfer of information between the units of the processor by means of the data bus, are also stored in a secondary control store whose contents are decoded by logic circuitry within the units of the processor which, in response thereto, couple the desired apparatus within the units to the data bus.

17 Claims, 10 Drawing Figures

PROCESSOR FOR A DATA PROCESSING SYSTEM

BACKGROUND OF THE INVENTION

1. Field of the Invention

This invention relates generally to data processing systems and more specifically to a processor within a data processing system.

2. Description of the Prior Art

The performance characteristics of any data processing system, such as that described in the U.S. Pat. Nos. 3,614,740, 3,614,741 and 3,710,324, all of which are assigned to the assignee of the present application and are hereby incorporated herein by reference, are primarily determined by the speed with which the processor fetches, interprets and executes instructions. In a system in which the operation of the processor is controlled by a control store which stores numerous microprogrammed addressable instructions with which the processor fetches, interprets and executes general instructions received from external devices; the speed with which these programmed addressable instructions are interpreted and executed by the various parts of the processor is an important factor in determining the performance characteristics of the machine.

Typically, to obtain the fastest speed possible, these instructions are directly executed; that is, the information contained in each instruction is coupled throughout the processor so that affected portions of the processor can directly execute the instruction in the least amount of time. This method of execution of the instructions is obviously very expensive in terms of the space required to couple the various bits of information contained in the instruction throughout the processor and also in terms of the logic circuitry used throughout the processor to interpret the instruction and control the processor accordingly. As the processor becomes more complicated the size of the programmed instructions will increase significantly, increasing the cost of the control store which stores these instructions, the amount of space consumed by additional conductors required to transfer the instruction throughout the processor and the amount of logic circuitry needed to interpret and execute the instruction.

Other processors which sacrifice performance for cost will utilize highly encoded instructions which will reduce the size or length of the instruction. This, of course, eliminates some of the conductors required to transfer the instruction throughout the processor and may reduce the amount of logic circuitry disposed throughout the processor for interpreting and executing the processor instructions. However, the performance characteristics of a processor utilizing this technique must suffer because of the extra time required for the additional decoding of each instruction.

SUMMARY OF THE INVENTION

The present invention overcomes the aforementioned difficulties with the prior art by providing a processor which is both performance-oriented and cost-effective.

In any processing system, certain of the instructions are executed considerably more often than others in the execution of any program. This is especially true in a system in which microprogrammed instructions are stored and utilized to fetch, interpret and execute general or macro-instructions stored in an external peripheral device. Thus, in the present invention, operations or instructions executed by the processor are classified as either primary or secondary. The primary classification includes the frequently executed instructions which must be performed as quickly as possible if the processor is to maintain high-performance characteristic. The secondary classification includes infrequently executed instructions which, though required for the overall operation of the machine, may be performed over a longer period of time without substantially affecting the high-performance characteristic of the processor. These secondary instructions may be intermediately stored and decoded thereby reducing the size of the instructions, reducing the amount of space consumed by conductors which must be coupled throughout the processor and reducing the amount of hardware or logic utilized throughout the processor for the execution of primary instructions.

If a processor instruction specifies a primary operation, the affected apparatus within the processor is directly controlled via enabling logic by the instruction and the data manipulation and/or transfer specified in the instruction is executed in the shortest time possible typically, within one microcycle (the time between retrieval of successive processor instructions).

Secondary instructions, or at least parts thereof, are stored in a secondary control register which establishes through decoding logic a transfer or communication path within the processor for the secondary operation or transfer. Although the secondary operation or transfer may be and often is performed over several microcycles, the overall performance of the machine is not materially affected because such operations or instructions occur infrequently.

In the preferred embodiment of the present invention, primary instructions are executed within one microcycle since a new instruction will be retrieved in the next microcycle. However, the information stored in the secondary control register remains stored therein until the secondary storage register is subsequently reloaded by the next secondary instruction. Between loadings of the secondary control register, primary instructions may be executed. During the execution of primary instructions, the transfer or communication path under the control of the secondary control register may or may not be utilized or, if required, may be disabled and another transfer path can be temporarily established. If a transfer path controlled by the secondary control register has been disabled in this manner, it is enabled or reinstated after the execution of the primary instruction. Thus, secondary operations may be stored in the secondary control register in advance of the time that they are utilized and a secondary instruction which is executed more than once in succession, even if separated by the execution of intervening primary instructions, need only be fetched and loaded into the secondary control register once.

DESCRIPTION OF THE PREFERRED EMBODIMENT

Figure 1:
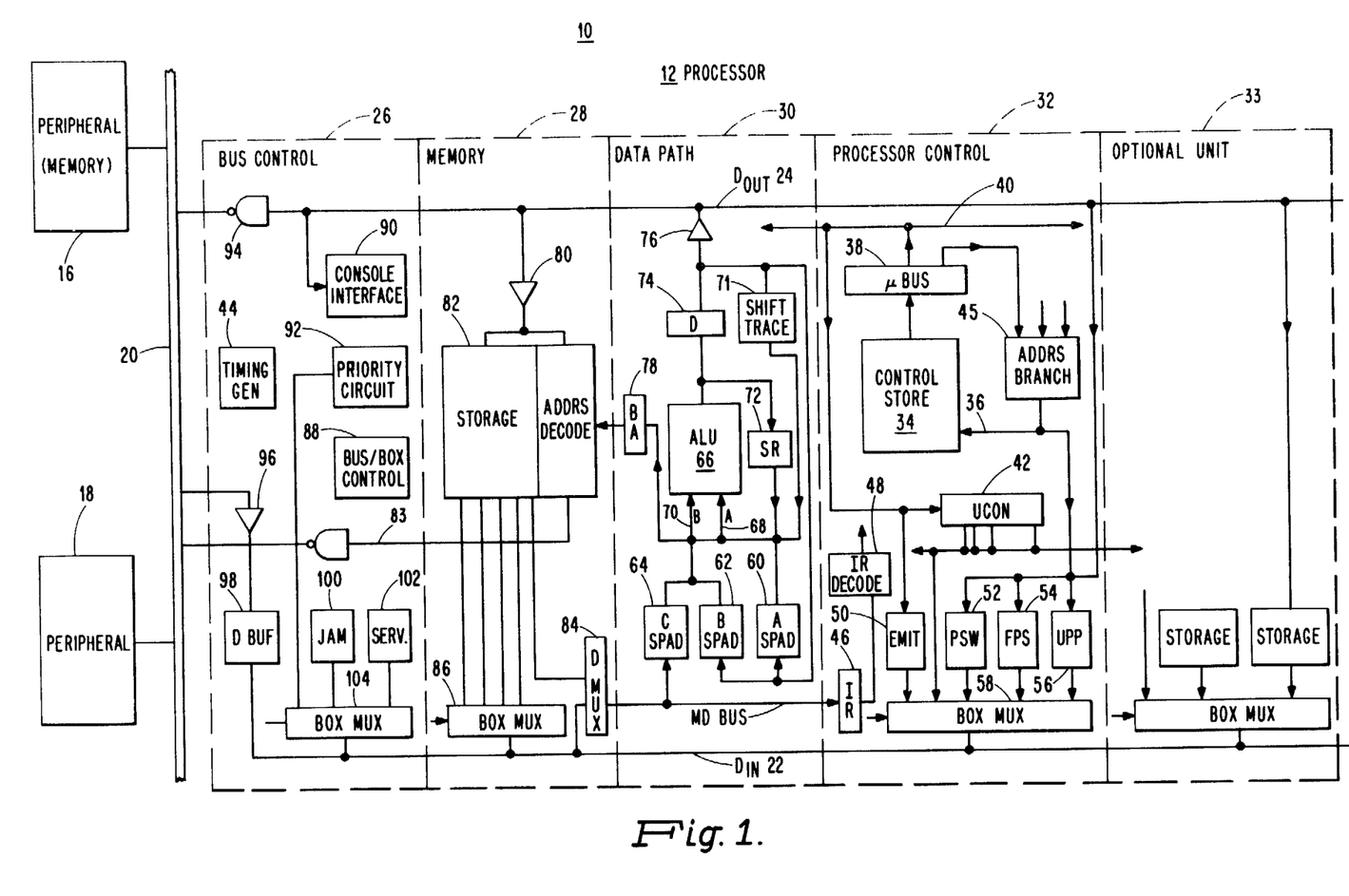
FIG. 1 is a block-schematic diagram illustrating a processor in a data processing system which incorporates the present invention.

Referring to FIG. 1, a block-schematic diagram of a data processing system 10 is shown which includes a processor 12 that incorporates the present invention. In addition to the processor 12, the data processing system 10 includes a memory 16 and at least one peripheral device, such as peripheral device 18, each of which is interconnected by a data bus 20. The data bus 20 couples all address, data and control information between the processor, the memory and the peripheral devices.

The processor 12 is comprised of a number of units, each of which is connected between a Din bus 22 and a Dout bus 24. The processor units, which will be described in greater detail hereinafter, include a bus control unit 26, for controlling the use of the data bus 20, a processor buffer memory unit 28 for storing data therein for quick retrieval by the processor 12, a data path unit 30 for performing arithmetic and manipulative operations on data, and a processor control unit 32 for storing previously programmed information utilized to fetch, interpret and execute the external instructions received by the processor 12. The processor 12 may also include additional units such as optional unit 33 coupled thereto for performing additional optional functions such as high speed floating point arithmetic. Additionally, it should also be noted and understood at this point that the configuration in FIG. 1 is exemplary and that other configurations may be utilized which incorporate the present invention.

Still referring to FIG. 1, and, in particular, to the processor control unit 32, a control store 34, typically a ROM, is shown therein which is preprogrammed with a plurality of processor instructions or microwords (hereinafter referred to as $\mu$-words) which are used to control the processor 12 for specific intervals of time. In the preferred embodiment shown in FIG. 1, the $\mu$-word is comprised of a multiple binary bit word which is divided into a number of fields. The interpretation of the various fields by the processor 12 dictates what action will take place therein. Each $\mu$-word is stored within the control store 34 at an addressable location. The address of the desired $\mu$-word is placed on the next $\mu$-word address bus (NUA) 36 and at the beginning of the next processor timing cycle or microcycle (hereinafter referred to as $\mu$-cycle) the contents of that location are read from the control store 34 and loaded into the microbus register 38.

At this point, a brief mention of the processor timing should be made since timing is a critical part of any data processing system. The timing generator 44, located in the bus control unit 26 in the preferred embodiment of the present invention shown in FIG. 1, produces a number of clock pulses during each $\mu$-cycle. At the beginning of each $\mu$-cycle, a pulse is generated and coupled to the control store 34 which causes the contents at the address indicated on the NUA bus 36 to be read and loaded into the Register 38. The $\mu$-cycle, which is defined for the purposes of the processor 12 utilizing the preferred embodiment, as the time between successive loadings of the register 38, may range from nanoseconds to microseconds depending upon the performance characteristics of the machine. During the interval between the pulses which load the register 38, the timing generator will produce several other clock pulses which are used to control the timing of events which the $\mu$-word has specified, such as, for example, loading of registers, transfer of information performing arithmetic operations in the data path 30, etc.

The contents of register 38 are coupled throughout the processor 12 over the $\mu$-word bus 40 for interpretation and implementation by the processor 12 as will be described in greater detail hereinafter. Various portions or fields of the $\mu$-word are coupled to the microcontrol register (UCON) 42 and the address and branching circuit 45.

As previously indicated, the $\mu$-word is composed of numerous binary bits which are grouped into fields for the purposes of interpretation. For example, a group of bits referred to as the micropointer field (UPF), contains the address of the next $\mu$-word to be addressed in the control store 34 since the processor 12 in FIG. 1 utilizes the technique of addressing the next $\mu$-word for execution commonly referred to as chained-sequencing addressing.

The $\mu$-word also contains a 6-bit field called the micro branching field (UBF) which designates branch tests to be performed within the processor 12 during a $\mu$-cycle. Both the UPF and the UBF fields are coupled to the address and branching circuit 45. Branch tests are utilized to alter the address of the next $\mu$-word if certain conditions, specified by the UBF field exist. The contents of certain bit locations in designated registers throughout the processor 12 which have particular significance with respect to the state of the processor are coupled to a logic circuit (not shown), typically a multiplexor, in the address and branching circuit 45. The UBF field, which is coupled to this logic circuit, selects certain of these information bits for logical combination, typically ORing, with the low order bits of the UPF field. If the conditions tested for by the UBF field are present, the UPF field is altered in response thereto, and the result is coupled to the NUA bus 36 for selecting the next $\mu$-word.

Several other fields are also included in the $\mu$-word. These include a clock field which designates which of certain devices are to be clocked and at what point in the $\mu$-cycle they are to be clocked at; a bus control field which indicates whether or not a transfer of data or control information is to be performed between units in the processor 12 or between the processor 12 and a peripheral device connected to the data bus 20; and a data path function field which controls the operation of the data path 30.

Some of the fields in the $\mu$-word such as, for example, the data path function field, will be interpreted differently depending on the processor operation specified by the $\mu$-word. More particularly, if the function specified by the $\mu$-word does not involve a data path operation, then the data path function field can be used for other purposes, examples of which will be provided hereinafter.

Several other registers and circuits are also contained in the processor control unit 32 depicted in FIG. 1. These include an instruction register (IR) 46, which is used to store general and special instructions received by the processor unit 12 from the data path 20, typically originating in the memory peripheral 16. General or macro instructions have been defined previously as those instructions which must be interpreted and executed by the processor 12 whereas special instructions are those instructions which are executed by an optional unit such as a high-speed floating point processor. Coupled to the IR 46 is an instruction register decode circuit 48 which decodes the IR 46. The output of the IR Decode circuit 48 is coupled to the address and branching circuit 45 where the UPF field is altered, if necessary, and the appropriate microprogram starting address is coupled to the NUA bus 36.

Four general purpose registers, the emit register 50, the processor status word register (PSW) 52, the floating point status register (FPS) 54, and the program micropointer (UPP) register 56, are used, under the control of the UCON register 42, to store certain information during the execution of the program by the processor 12. For example, the emit register 50 is used to store an entire field in the $\mu$-word which may be used as data by the data path 30 at a later time. The bits comprising this field are situated in the same location within the $\mu$-word that would ordinarily comprise the datapath function field because, as explained earlier, a datapath function will not be needed in this $\mu$-word. The PSW register 52 is used to perform the same function as the status register 59 described in aforementioned U.S. Pat. No. 3,710,324. This register contains such information as the present mode of operation of the processing unit, the previous mode of operation, the priority level at which the processor is operating and the condition codes, all of which are described in U.S. Pat. No. 3,710,324.

The FPS register 54 is utilized to store status information similar to the PSW register 52 when an optional floating point processor is coupled to the processor unit 12 and the UPP register 56 is utilized to track the $\mu$-word so that, for example if the microroutine is interrupted, the address of the last $\mu$-word before the interruption will be stored therein.

Lastly, the processor control unit 32 in FIG. 1 includes a box multiplexor circuit 58 which is utilized under the control of the UCON register 42 to selectively couple the contents of one of the four status registers 50, 52, 54 and 56, to the Din bus 22. This device, along with the other box multiplexors disposed in the other units of the processor 12, will be described in greater detail hereinafter.

The data path unit 30 contains various holding registers, storage locations, logic circuitry and an arithmetic logic unit (ALU) which are used to perform the data manipulations within the processor 12. In particular, the data path 30 shown in FIG. 1 contains three scratch pads, 60, 62 and 64. The A & B scratch pads, 60 and 62, are general purpose scratch pads and are the primary storage location for data which will be used by the data path in the execution of a program. The C scratch pad 64 is a special purpose scratch pad which is used by the data path 30 to store error log information, constants often used by the data path in its operation and to initially store all data coupled into the data path. More specifically, a special register, MD, within the C scratch pad 64 is loaded with any data or control information which is coupled on to the Din bus 22.

The A and B scratch pads, 60 and 62, have certain storage locations therein reserved for the general purpose registers described in U.S. Pat. No. 3,710,324. For example, these include a program counter register, which is sequentially incremented to indicate the address of the next general or special instruction which the processor 12 will fetch, interpret and execute and a stack pointer register which points to an address in a section of memory reserved as stacks and where the contents of the program counter register and the FPS Register 52 for various microroutines in the processor control unit 32 may be stored for later reference when the processor 12 is interrupted, for example, by an external peripheral device requesting service therefrom.

The ALU 66, which performs the arithmetic and logical data manipulations in the processor 12 has two inputs thereto; an A input 68 and a B input 70. The A input 68 has coupled thereto the inputs from the A scratch pad registers 60, the shift tree 71, and a shift register 72. Coupled to the B input 70 are the outputs from the B scratch pad registers 62 and the C scratch pad registers 64. The ALU 66 performs the operations specified by the $\mu$-word on the data which is coupled to it on the A and B inputs 68 and 70, respectively. These operations include adding, subtracting, ANDing, ORing, incrementing, decrementing, etc.

The D register 74 and the shift register 72 are holding registers which are coupled to the output of the ALU 66. The D register 74 may be written with the output of the ALU 66 and/or read from during any $\mu$-cycle. The contents of the D register may be directed to a number of locations by the $\mu$-word, such as other locations in the data path 30, other units in the processor 12, and external peripheral devices coupled to the data bus 20. The shift register 72 is a register into which the output from the ALU 66 may be stored and shifted one bit to the left or right. Additionally, the shift register may be used for other functions, such as a temporary holding register which may be used to provide data to the A input of the ALU 66 in subsequent operations.

The shift tree 71 performs various operations on the data stored in the D-register 74 such as a single bit shift to the left, a multiple bit shift to the right, sign extensions and byte swaps. Unlike, the shift register 72 and the D register 74, the shift tree 71 is a combinational logic element which does not hold its output across subsequent $\mu$-cycles. Thus, the output of the shift tree 71 must be operated on by the ALU 66 in the same $\mu$-cycle that the output from the D-register 74 is modified.

The remaining elements of the data path unit 30 shown in FIG. 1 are a logic gate 76 through which the contents of the D register are coupled to the Dout bus 24, and a bus address register (BA) 78 coupled to the A input 68 of the ALU 66 and into which the address of a location is loaded to or from which data and/or control information will be transferred. This address may include the address of any location within a peripheral device connected to the data bus 20 or to a location within the memory unit 28.

Figure 3:
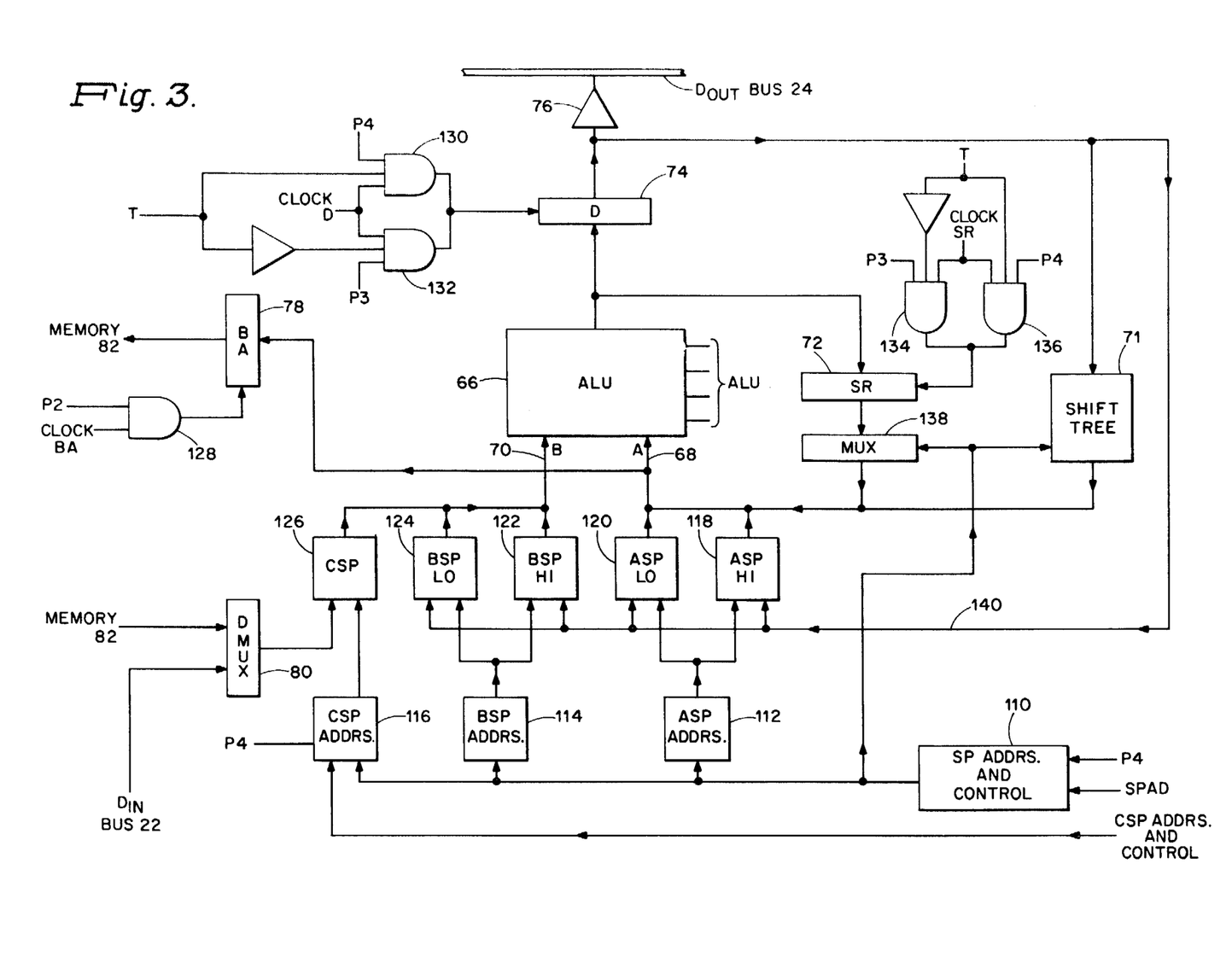
FIG. 3 is a more detailed block-schematic diagram of the data path unit in the processor depicted in FIG. 1.

As previously indicated, the data path function field of the $\mu$-word controls the operation of the data path 30. In particular, this field indicates the location within the scratch pads which will be coupled to the arithmetic logic unit, the function which the ALU 66 or the shift tree 71, if any, will perform and the disposition of the resulting product from the ALU 66. An additional field in the μ-word will control the loading, if any, of the contents of the D register into a register in the A or B scratch pads. The μ-word also controls the loading of the bus address register 78 and any shifting operations performed by the shift register 72. The circuitry within the data path 30 for interpreting the μ-word is illustrated in FIG. 3 and will be discussed in further detail hereinafter.

The principal data buses within the processor unit 12, Din 22 and Dout 24, which interconnect the various units within the processor should be discussed briefly at this time. In particular, the Dout bus 24 is the bus over which the contents of the D register are coupled to any unit within the processor 12 or to the data bus 20 for coupling to a peripheral unit. Thus, the D register 74 is the source of all information which is coupled onto the Dout bus 24.

The Din bus 22 is used to couple data and control information to the datapath. As described hereinafter, all data present on the Din bus is coupled to a general storage register MD within the C scratch pad of the data path unit 30 except that as earlier noted, general and special instructions are coupled to IR 46. Thus, the data path is the destination of all information coupled on to the Din bus 22. It should be noted that although the processor depicted in FIG. 1 is shown having two principal data busses, the present invention is not so limited and in fact may work with a processor having only one primary data bus or a plurality thereof.

The memory buffer unit 28 is comprised of a logic gate 80 which couples data from the Dout bus to the memory circuitry 82. The memory buffer unit 28 contains an address decoding circuit and a memory storage circuitry. The address decoding portion is used to enable the storage location addressed within the memory buffer unit 28 to be written into or read from as desired if the address designated in the bus address register 78 is located within the memory buffer unit 28. If the addressed location is not within the memory buffer unit 28, the address decoding circuit will couple the address on to the address conductors of the data bus 20 via bus 83 and logic gate 86, thereby enabling communications or data transfers between the processor 12 and a location in one of the peripherals assigned with the address.

When data is retrieved or read from the memory buffer unit 28, the contents of the location being read are coupled through the D multiplexer 84 and into the MD register of the C scratch pad 64. The processor memory unit 28 also contains a box multiplexor, similar to the box multiplexor 58 in the processor control unit 32, which selectively couples certain storage locations within the memory unit 28 which may from time to time be used as general storage locations by the data path 30 or as a means of diagnosing parts of memory buffer unit 28.

Still referring to FIG. 1, the bus control unit 26 includes a bus/box control circuit 88 for monitoring the use of the Din and Dout buses as will be described in greater detail hereinafter, the timing generator 44 as earlier mentioned, and logic gating circuits 94 and 96 through which data is coupled to and from, respectively, the data bus 20.

A console interface circuit 90 and an interruption priority circuit 92 are also disposed in this unit. These perform similar functions to the bus interface unit 36 and interruption priority unit 38 described in U.S. Pat. No. 3,710,324. Specifically, these units generate and monitor the protocol described in the aforementioned U.S. Patents between peripheral devices connected to the data bus 20 and the processor unit 12 and monitor the priority level of service requests from the various peripheral devices coupled to the data bus 20.

The bus control unit 26 also includes a jam and a service register which are used to store flags or error conditions which cause the processor to completely abort a microroutine (jam) or interrupt (service) the execution of a microroutine and which is subsequently used by the processor to determine which μ-word to execute. A box multiplexor 104 similar to box multiplexors 86 and 38 is utilized to selectively couple information from either the console interface 90, the jam register 100 or the service register 102 to the Din bus 22.

As earlier explained, the present invention is incorporated in the processor 12 of the data processing system 10 to provide both a high performance and cost effective processor. A fundamental criteria of performance of a machine or processor is the speed with which the machine executes instructions and programs. As earlier noted, directly coupling the μ-word throughout the processor for execution is faster than decoding a highly encoded μ-word. Direct coupling of the μ-word requires the use of valuable space consumed by the additional conductors which must be coupled throughout the processor, and increases the size of the μ-word due to the fact that time cannot be spent in decoding the bits thereof. As the size of the μ-word is increased, more space, additional conductors, and more implementation logic is required. On the other hand, if a number of intermediate decoding operations are utilized, the size of the μ-word can be decreased, the amount of space consumed by the conductors interconnecting the units of the processor can be reduced, and the implementation logic can be simplified. However, because additional time in the form of extra μ-cycles is consumed in decoding every μ-word, the performance of the machine is reduced.

By making use of the fact that in such a processor a relatively small proportion of the instructions are executed a substantial majority of the time, the present invention makes possible a processor which, as indicated before, is both high performance and cost effective. Specifically, the present invention includes a processor in which this small proportion of frequently executed instructions are directly coupled to the units of the processor 12 and executed thereby, whereas the majority of infrequently incurring instructions are indirectly executed. Thus, with respect to a processor in which each μ-word is coupled throughout for direct execution, the incorporation of the present invention therein permits a reduction in the length of the μ-word, in the amount of space consumed by conductors required to transfer the bits of the μ-word, and in the amount of additional enabling logic used in each unit of the processor without materially affecting the performance of the processor.

Because the processor units of the preferred embodiment of the processor 12 are logically organized according to the functions they perform, transfers of information between individual locations in different units of the processor generally occur infrequently in the execution of any particular general or special instruction whereas intraunit transfers and data manipulations occur frequently in any such execution. Thus, in the processor of the preferred embodiment, all intraunit transfers and data manipulations have been classified as primary, that is, within the small proportion of processor instructions or μ-words which are executed a majority of the time. On the other hand, interunit transfers of information are classified as secondary, that is, within the large proportion of μ-words which are executed infrequently. Thus, with the exception of a few μ-words which specify intraunit transfers, all such μ-words returned by the control store of the processor 12 will be executed indirectly as described hereinafter.

As an illustration of a primary operation within the processor, the execution of a μ-word within the data path unit 30, has been chosen which illustrates both the speed with which the operation is performed and the cost of this speed in terms of the space consumed by the numerous conductors which must be coupled from the microbus register 38 and the logic required to implement the instruction. In the example, the contents of a register in the B scratch pad 62 will be added to the contents of a register in A scratch pad 60 and the result will be written back into the A scratch pad 60.

Figure 2A:
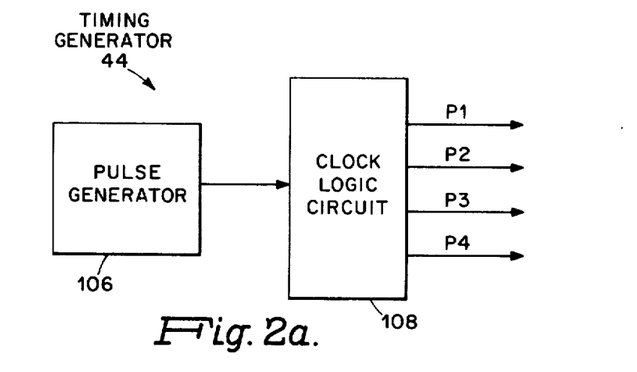
FIGS. 2a and 2b represent respectively, a block-schematic diagram of the timing generator utilized by the processor in FIG. 1 and the timing of the clock pulses produced thereby.
Figure 2B:
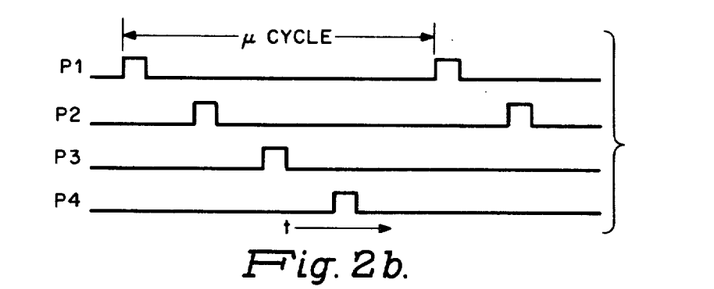

Before proceeding with the example, however, a more detailed description of the timing generator 44 should be made. Referring to FIG. 2a, the timing generator 44 is simply represented as a pulse generator 106 which produces a uniform series of clock pulses coupled to a clock logic circuit 108. The clock logic circuit 108 generates four synchronous and sequential pulse streams therefrom, P1, P2, P3 and P4, as despicted in FIG. 2b. As earlier noted, the microbus register 38 is loaded on the first clock pulse (P1) of each μ-cycle. Therefore, a μ-cycle is defined as the period of time between successive P1 pulses as shown in FIG. 26. It should be also pointed out that the configuration of the timing generator 44 shown in FIG. 2a is a simplified version and in many applications it may be desirable to generate pulse streams which are unequally spaced in time and in which some of the pulses may have negative pulses with respect to the zero or reference level.

Returning now to the example of the execution of a primary μ-word in the data path 30; the contents of a register $R_o$ in the B scratch pad 62 will be added with the contents of a register $R_1$ in the A scratch pad 60 and the result will be written back into register $R_1$ of the A scratch pad. This may be represented mnemonically as $AR_1 \leftarrow BR_o + AR_1$. Accordingly, the primary μ-word specifying this operation, then, is loaded into the microbus register 38 during P1 clock pulse of the μ-cycle. Simultaneously, the information contained therein is coupled throughout the processor and, more particularly, for the purposes of this example, to the data path unit 30.

Referring now to FIG. 3, an expanded view of the simplified data path 30 of FIG. 1 is depicted. FIG. 3 includes the control logic necessary to operate the data path 30 at high speed. Moreover, the A and B scratch pads 60 and 62 of FIG. 1 are both subdivided in FIG. 3 into two smaller scratch pads, 18, 120, and 124, to simplify the addressing and control of the scratch pads.

The data path function field of the μ-word is coupled to the appropriate logic control circuitry within the data path 30 simultaneously with the loading of the microbus register 38. Part of this field, the SPAD field, which is used for scratch pad addressing and control, that is, for determining which registers in the A and B scratch pads will be addressed and selected and/or loaded with data, is coupled to the scratch pad address logic 110. Another part of this field, the ALU field, which controls the operation performed by the ALU 66 (i.e., add, subtract, select A only, select B only, etc.) is coupled to the ALU 66. Clocking information contained in the clock field of the μ-word is coupled to the D register 74 and the shift register 72.

Before the P2 clock pulse is generated in this μ-cycle, the scratch pad address control circuit (SPADCC) 110 responds to the SPAD field, which typically may total in excess of 12 bits of information, by generating an address signal and an enable signal for each scratch pad which is coupled to the A and B scratch pad address registers 112 and 114 respectively. The outputs of the A and B scratch pad registers 112 and 114 are coupled to the both high and low sections of the respective scratch pads, 118, 120, 122, 124 whereupon the contents of the appropriate registers in the A and B scratch pad are coupled to the A and B inputs of the ALU 66. In the example, then, the contents of register $R_1$ in scratch pad 120 is coupled to the A input of the ALU 66 while the contents of register $R_o$ in scratch pad 124 is coupled to the B input thereof, all before the P2 clock pulse is generated.

As an alternative to selecting a register in the A scratch pad 118 and 120, the SPADCC circuit 110 may enable a multiplexor 138 thereby coupling the contents of the shift register 71 to the A input of the ALU 66. Also, the output of the shift tree 71 may be selected for coupling to the A input of the ALU 66. Additionally, the SPADCC circuit 110 in conjunction with the scratch pad address register 116 may select the contents of a register in the C scratch pad 126, in lieu of a register from the B scratch pads 122 and 124 for, coupling to the B input of the ALU 66.

When the P2 clock pulse of this μ-cycle is generated, it will have no effect on the data path unit 30 in this example. However, if, for example, data was required from memory, then the bus address register 78 would be loaded at this time in the μ-cycle with the information on the A input to the ALU 66 which would comprise the address of data to be retrieved. An enable gate 128 which controls the loading of the bus address register 78 is enabled by the P2 clock pulse and a clock BA bit in the clock field of the μ-word.

Returning to the example under consideration, the ALU 66 performs an addition of the data coupled to the A and B inputs thereof (i.e. the contents of A scratch pad register $R_1$ and B scratch pad register $R_o$, respectively) and the summation is coupled to the D register 74. As previously noted, the function performed by the ALU 66 is determined by the ALU field of the μ-word which is coupled to the ALU 66. Since ALU 66 performs numerous functions the ALU field is comprised of a plurality of bits. In FIG. 3, a four-bit ALU field is depicted which is required to accomodate the 16 different functions performed by the ALU 66.

The output or summation of the ALU 66 which is coupled to the D Register 74 and, in this example, is loaded therein during the P3 clock pulse. The circuitry for controlling the loading of the D register 74 is comprised of two tri-input nandgates 130 and 132. The field of the μ-word which controls the loading of the D register 74 is comprised of two bits. The first bit, clock D, is coupled directly to both gates 130 and 132 and controls whether or not the D Register will be loaded during the μ-cycle. The second bit, the T bit, controls the actual timing of the loading operation into the D Register 74. More particularly, if the value of the T bit is a binary one, the D register will be loaded during the P4 clock pulse whereas loading of the D register occurs during the P3 clock pulse if the T bit is binary 0.

Although the shift register 72 is not utilized in this example, it can be seen that the same type of control (ie, two tri-input nandgates 134 and 136) is used to control the loading of shift register since it may also be loaded either during the P3 or P4 clock pulses. Similar to the D register control circuitry, the field of the μ-word which controls the shift register is comprised of two bits. The first bit, a clock SR bit, controls whether or not the shift register will be loaded in the μ-cycle. The T bit is used again to control the timing of the loading operation into the shift register. Thus if the shift register 72 and the D register 74 are both loaded during the same μ-cycle, they are loaded at the same time.

Once the D register 74 is loaded, the summation is available on the A and B scratch pad input bus 140 for loading during the P4 clock pulse. Accordingly, when the P4 pulse is generated, the summation will be written, under the control of the SPADCC circuit 110 as earlier noted, into the R₁ register of A scratch pad 120, completing the execution of this primary μ-word.

In the present invention, it is necessary to distinguish between primary and secondary operations. As earlier noted, secondary operations are, for the purposes of the preferred embodiment of the invention, comprised of all inter-unit processor transfers; that is, transfers of data and/or control information other than μ-words beteen the data path and other units of the processor 12, including any optional units which may be coupled to the processor 12. However, one exception is made to this definition because of the frequency with which it occurs. This exception comprises μ-words which require the retrieval of information from a location in the memory buffer unit 28 into the data path unit 30 through the D-multiplexor 80. It should also be noted that μ-words which require a transfer of any information between the data path 30 and an external peripheral device are included in the primary classification. Thus, all operations in which data or control information is transferred over the Din bus 22 or the Dout bus 24 are secondary operations except transfers between the data path and external peripheral devices coupled to the data bus 20.

Figure 4:
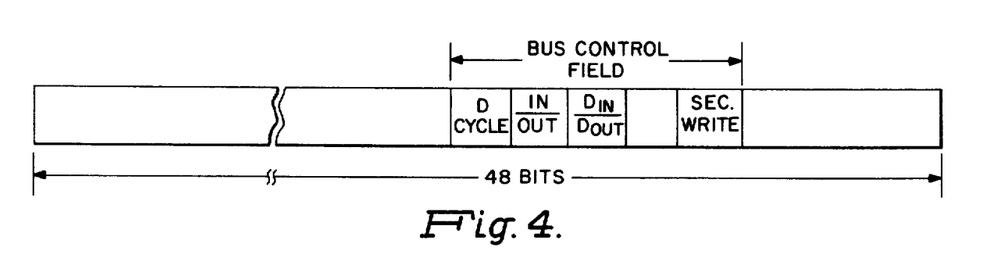
FIG. 4 is a representative illustration of a bus control field of information contained in each microprogrammed processor instruction indicating a means used by the processor to distinguish between primary and secondary instructions.

Referring to FIG. 4, a segment or field of the μ-word, the bus control field, is illustrated which is used to distinguish between primary and secondary processor instructions or μ-words. Because of the manner in which primary and secondary operations have been defined for the purpose of the preferred embodiment of the present invention; two bits, the D-cycle bit and the IN/OUT bit, of the bus control field are required to distinguish between primary and secondary μ-words.

The D-cycle bit distinguishes between a μ-word which requires use of the Din or Dout busses as opposed to one that does not. Thus, for example, a binary one in the D-cycle bit indicates that a transfer over one of these two busses is required whereas a binary zero in this bit indicates that these busses will not be used during the μ-cycle. The IN/OUT bit of the bus control field is utilized by the processor in conjunction with the D-cycle bit to distinguish between internal and external operations over the Din and Dout busses. For example, when the D cycle bit is a binary one and the IN/OUT bit also has a value of binary one, then the μ-word has specified a D-bus operation which is internal or as previously defined, a secondary instruction or μ-word. However, a value of binary zero in the IN/OUT bit in conjunction with a value of binary one in the D-cycle bit indicates a transfer over the Din and Dout busses between the data path unit 30 and an external peripheral device coupled to the data bus 20 which has been defined as a primary μ-word for the preferred embodiment shown in FIG. 1. In any event, it can be appreciated from the above description that the number of bits required by a processor incorporating the present invention to distinguish between primary and secondary μ-words is dependent upon the definition of primary and secondary and will vary accordingly. The remaining bits of the bus control field, the primary/secondary cycle control bits, are utilized to supply additional control information for Din and Dout bus control information such as, for example, designating between the Din and Dout bus for the transfer of information, etc.

Figure 5:
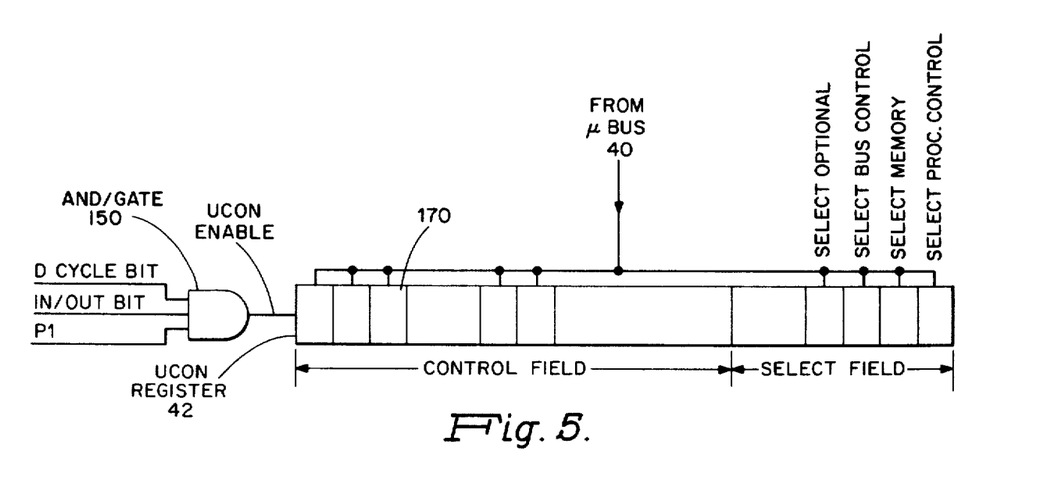
FIG. 5 is an illustration of the secondary control store register utilized to store secondary instruction or portions thereof.

If the μ-word defines a secondary transfer (ie, the D-cycle and the IN/OUT bits both have a binary one value), control information in the μ-word relating to the inter-unit transfer is stored in the UCON register 42. Specifically, as shown in FIG. 5, the loading of the UCON register 42 is controlled by an AND/gate 150 having inputs coupled to the D-cycle bit and IN/OUT bit of the μ-word. The portion of the μ-word typically reserved for the data path function field may be used as a source for the UCON register since by definition, a data path operation is primary and thus will not be used in this μ-word.

In the preferred embodiment of the present invention, the UCON register 42 stores a plurality of bits which are divided into two fields; the select field and the control field. The select field is used to designate which unit in the processor will communicate with the data path 30. Thus, the number of bits comprising the select field is determined by the number of units within the processor unit 12 including optional units which may be coupled thereto. More particularly, the number of bits in the select field is equal to the number of units coupled to the processor unit 12 in addition to the data path 30. Moreover, in the preferred embodiment, only one unit is permitted to communicate with the data path at any one time, only one bit within the select field of the UCON register 42, may have a value of binary one at any one time, where a binary one is the value used to select a unit. It should be noted; however, that with the addition of appropriate logic circuitry and/or μ-word bits more than one unit may be selected in the select field of the UCON 42 at one time.

The control field of the information stored in the UCON 42 is used on conjunction with the select field to provide additional control information necessary to execute the secondary μ-word. Referring again to FIG. 1, it can be seen that all of the devices which communicate with the data path 30 over the Din bus 22 are coupled thereto through a box multiplexor such as multiplexor 38 in the processor control unit 32. Although not shown in FIG. 1, each unit may have more than one multiplexor and each multiplexor may have several registers or other storage devices coupled thereto. Thus, the control field of the information stored in the UCON register 42 is used to select the multiplexor and the register or other storage device within the selected unit for communication with the data path 30. Since the control field of the UCON register is decoded in conjunction with the select field, and only one unit is selected at any one time, the same bits within the control field may be utilized for selection of the various registers and storage devices within all of the units of each unit within the processor 12.

Figure 6:
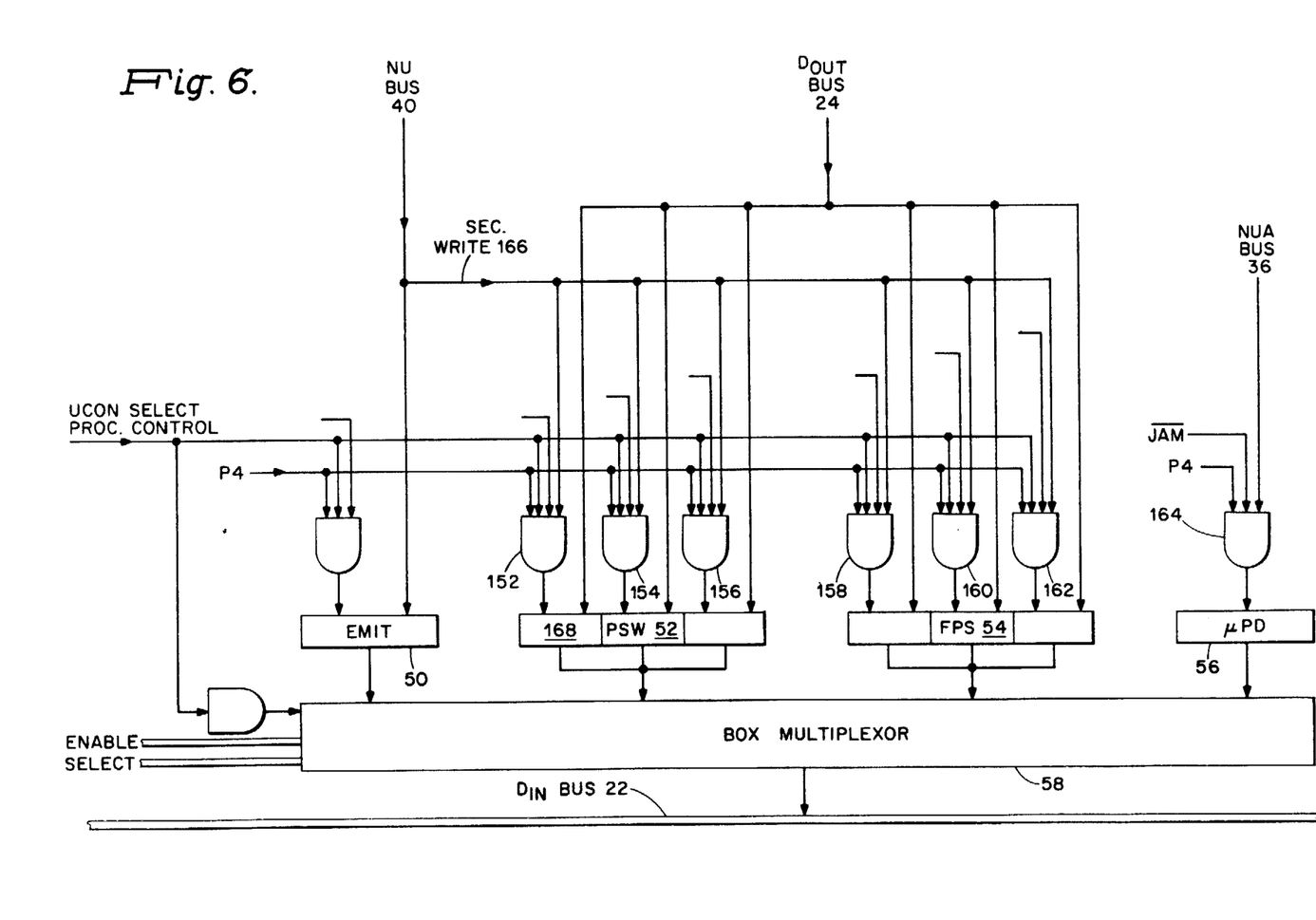
FIG. 6 is a schematic illustration of the logic circuitry used in each unit of the processor to decode the contents of the secondary control store register and control the transfer of information in response thereto.

Referring now to FIG. 6, logic circuitry which may be incorporated in a unit of the processor 12 such as the processor control unit 32, to decode the select and control fields of the UCON register 42 is depicted. In FIG. 6, the inputs to registers 50, 52, 54 and 56, are shown in greater detail. For example, the FPS 54 and the PSW 52 are comprised of three registers each having an input which is individually controlled by the UCON register 42 via a logic gate. Specifically, the input to registers 52 and 54 are controlled by a multiple-input AND gate. Each of these AND gates (152 through 162) has one input coupled to the select processor control unit bit of the select field of the UCON register 42; a second input individually coupled to a bit in the control field associated with the register or storage device controlled by the AND gate; a third bit coupled to the secondary write bus 166; and a fourth input coupled to one of the clock outputs. The secondary write bus 166 is coupled to the secondary write bit in the bus control field of the μ-word as depicted in FIG. 4. Accordingly, if it is desired to load the first register 168 of the PSW 52, then the processor control unit select bit and the associated control bit (bit 170 in FIG. 3), in the UCON register 42 must both have a value binary one and the secondary write bus must be enabled. Thereafter, when the P3 clockpulse is generated, the contents on several conductors of the Dout bus 24 will be loaded into this register 168 of the processor status register 52 through gate 152. As earlier mentioned, it is also possible to simultaneously load the data on the Dout bus 24 into registers in different units by selecting more than one unit in the select field of the UCON 42.

Since the Dout bus 24 is not the source of information loaded into all the storage registers throughout the processor which are coupled through multiplexors to the Din bus 22, various schemes for controlling the loading of these registers may be used. For example, the micropointer register (UPP) 56 is loaded with the contents on the NUA bus 36 during each μ-cycle. Thus, as shown in FIG. 6, the control mechanism for loading of a UPP 56 is a gate 164 which is clocked once each μ-cycle during which the contents on the next NUA bus 36 are stored in the UPP 56. A second input coupled to gate 164 indicates whether or not the processor is servicing a jam routine. If so, the timing gate 164 is disabled preventing the UPP 56 from being updated until the jam routine has been completely executed. At the conclusion of the jam routine, the UPP 56 will contain the address of the last μ-word issued by the control store prior to the jam routine permitting the processor to re-enter the microroutine at the correct point.

If the contents of one of the status registers in the processor control unit 32 are to be coupled in to the data path 30, the box multiplexor 58 must be conditioned appropriately. The box multiplexor 58 is controlled by a plurality of inputs which include the processor control unit select bit from the select field of the UCON register 42, and a plurality of bits from the control field of the UCON register comprising two fields, an enable field and a status register select field. The status register select field is utilized to control which of the four inputs of the multiplexor is selected for coupling to the Din bus 22. The enable field is used to enable the multiplexor and to select between multiplexors in processor units which have more than one multiplexor. With the appropriate control information coupled to the multiplexor 58, the contents of the desired register, such as processor status register 52, are coupled to the Din bus 22 for writing into the C scratch pad of the data path 30 under the control of the C scratch write bus of the μ-word in any μ-cycle after the UCON register is loaded.

At this point it is important to distinguish between a significant difference in characteristics between primary and secondary operations in the preferred embodiment of the invention. As earlier indicated primary operations are executed directly in response to the contents of the microbus register 38 by appropriate logic in the units of the processor. Therefore, the execution of a μ-word must be completed in one μ-cycle since, as previously pointed out, the microbus register is loaded with a new μ-word at the beginning of each μ-cycle. Secondary operations on the other hand are controlled by the UCON register 42. This register is loaded in a μ-cycle in which a secondary μ-word is retrieved from the control store 34 and its contents remain unchanged until it is loaded with the contents of the next secondary μ-word which may not occur for many μ-cycles. Thus, the execution of a secondary μ-word may take place over several μ-cycles and, if the subsequent secondary operation requires a similar execution, the UCON register 42 need not be loaded again. Additionally, as will be shown in an example hereinafter, both a read and a write operation into the storage devices or register in the same processor unit may be set up by the same secondary μ-word even through the apparatus and logic implementing such reading and writing operations are different.

To illustrate, the contents of a status register selected for coupling to the data path are coupled immediately to the Din bus 22 and remain coupled thereto until the microcontrol register 42 is loaded with a new secondary instruction or unless it is temporarily disabled by the bus control circuits in the bus control unit 26 as will be described more fully hereinafter. The data path is loaded with this information in the next μ-cycle in which the C scratch pad write bit is enabled. On the other hand, loading information from the Dout bus 24 into a register such as the PSW 52 is implemented differently since this will not occur until the secondary write bit is enabled in a μ-word. Thus, the information necessary to set up the loading of a status register can be loaded into the UCON register 42 ahead of time since it will have no effect until the logic is enabled by a signal from the secondary right bit in a subsequent μ-word.

Referring back to FIG. 1, the bus/box control circuit 88 in the bus control unit 26 of the processor 12, is utilized to disable all multiplexors in the units of the processor 12 at specified times. As noted earlier, communications between an external peripheral device and the processor 12 are transmitted over the Din bus 22 or the Dout bus 24 and the data bus 20. At these times, it is necessary to disable the multiplexors so that the outputs therefrom will not interfere with the transfer of information from the data bus 20 to the data path unit 30. This is provided for in the preferred embodiment of the present invention by a bus control circuit 88 which monitors the D-cycle bit and the IN/OUT bit of the μ-word bus control field. Specifically, as earlier explained, when the value of these bits respectively are binary 1 and binary 0, the μ-word has defined a primary transfer operation over either the Din bus 22 or Dout bus 24 between a peripheral device and the data path 30. The bus/box control circuit which is coupled to these two bits of the μ-word generates a disable signal which is coupled to all box multiplexors thereby disabling all the box multiplexors and clearing the Din bus 22 so that a transmission from the external peripheral device is not interfered with. In the preferred embodiment of the present invention, the generation of the disable signal from the bus/box control circuit 88 is delayed by one μ-cycle from the μ-cycle in which the bus/box control circuit 88 is enabled since the processor 12 is arranged so to permit an extra μ-cycle for the transfer of information from peripheral devices over the data bus 20 since some peripheral devices may not operate at speeds comparable to that of the processor 12. It can thus be appreciated that the bus control circuit 88 may be arranged to generate the disable signal during or after the μ-cycle in which the bus control circuit 88 responds to the IN/OUT field of the μ-word depending upon the configuration and timing constraints of the system.

As an illustration of the present invention, the operation of the processor in servicing a request for processor service from a peripheral device coupled to the data bus 20 will be described below.

Since the processor 12 of the preferred embodiment communicates with the peripheral devices coupled to the data bus 20 in the same manner as the processors described in the aforementioned patents, it must be able to interrupt the execution of a routine to service a request from a peripheral device assigned a higher priority than the processor at the time the request is issued. If such a peripheral device issues a bus request (BR) signal indicating a request for service from the processor, the BR signal is coupled to the bus control unit 26 and, after determination of the appropriate priority by the priority control circuit 92, a service register (not shown) within the bus control unit 26 will be loaded indicating that a higher priority peripheral device is seeking service from the processor 12.

Figure 7A:
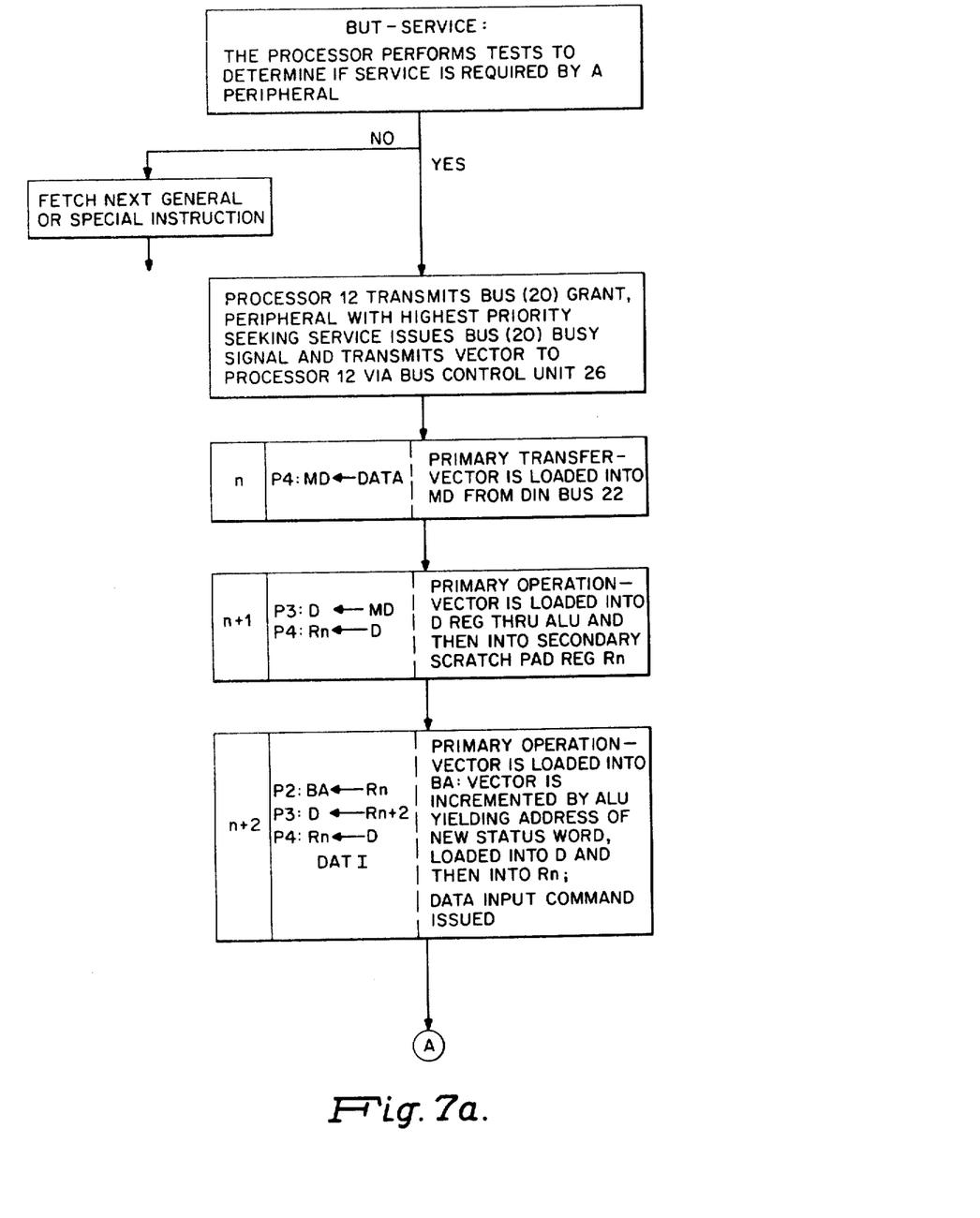
FIGS. 7a, b and c are a flow diagram indicating a series of typical sequences of primary and secondary instructions executed by the processor.
Figure 7B:
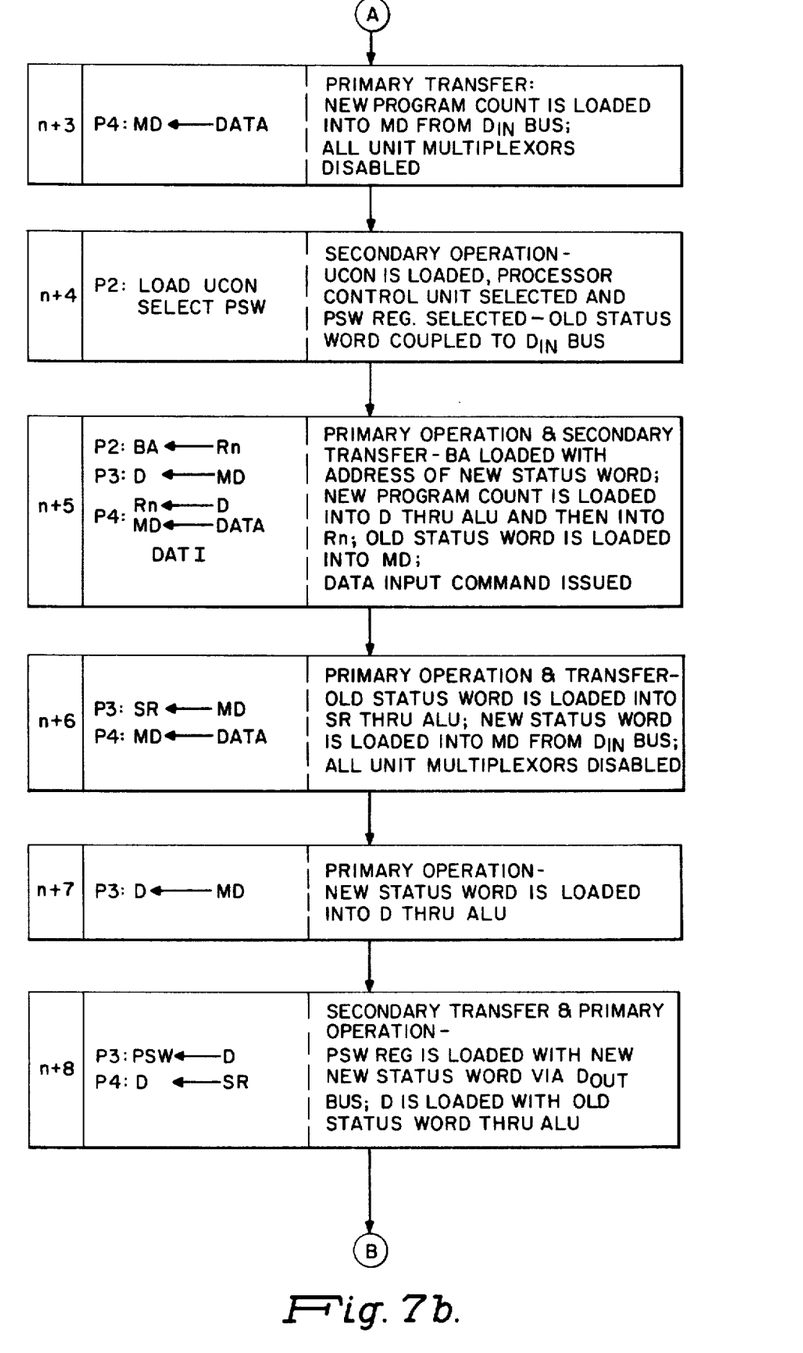
Figure 7C:
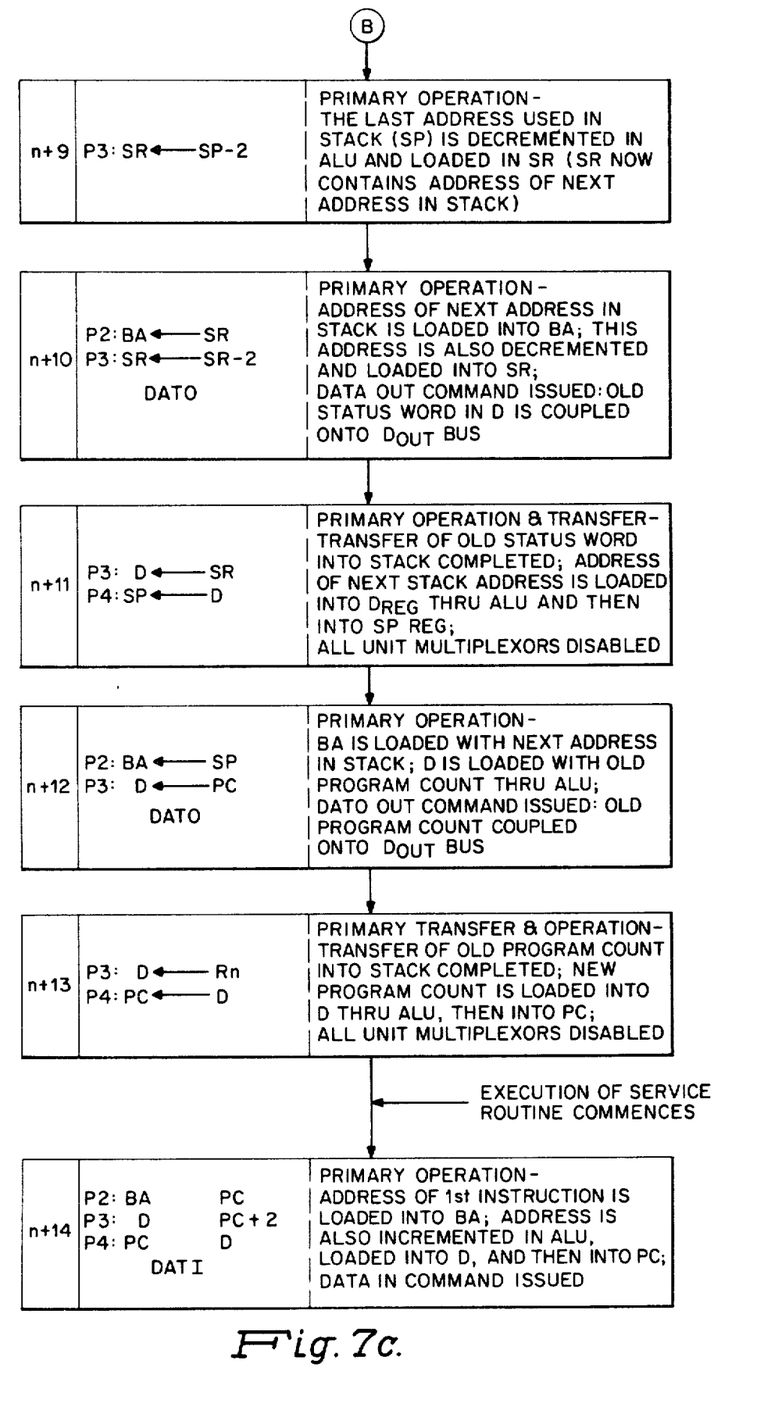

Referring now to FIG. 7, the operation of the processor 12 in handling the service request is mnemonically illustrated. As shown therein, the processor 12 will complete the execution of the general instruction which it is currently executing without interruption. At the conclusion of the execution of this instruction, the control store 34 issues a μ-word which performs a series of service request tests (service branch microtests or BUT service) before fetching the next general or special instruction for execution. If the result of the test for service is negative, the next general instruction is fetched from the external memory 16. If, however, the service request is positive indicating that a peripheral device of sufficient priority does require service, the UPF field of the service request test μ-word is modified in the manner earlier described, yielding the address of the first μ-word in a microroutine used by the processor 12 to service the request. At this time, the bus control unit 26 of the processor 12 transmits a bus grant signal to the peripheral bus 20 via data bus 20.

In the manner described in the aforementioned patents, the peripheral device with the highest priority seeking service will respond to the allow bus request signal by transmitting a vector over the data bus 20 which is transmitted to the processor 12 and coupled on to the Din bus 22 by the bus control unit 26. The vector generated by the peripheral device is typiclly comprised of an address within the external memory 16 to which the processor can be directed to obtain the starting address of the routine necessary to service the peripheral device's request. Accordingly, a μ-word is selected from the control store, during in the next μ-cycle, n, which specifies a C scratch pad write command causing the MD register (the general register within the C scratch pad which has been designated to receive all incoming information to the data path) to be loaded with the vector. The next μ-word, n+1, specifies a secondary register $R_n$ in the A scratch pad 60 into which the vector will be stored. Accordingly, this μ-word directs the contents of the MD register to be coupled through the ALU 66 into the D register and thereafter loaded into the $R_n$ register of the A scratch pad 60.

The vector, which is now residing in the $R_n$ register of the A scratch pad 60, is an address typically within the external memory 16 whose contents will typically contain the address of the first instruction in the routine which must be executed by the processor 12 to service the peripheral device. In addition to the first address in the routine, the processor usually must be provided with a new processor status word which provides the processor with the necessary mode, condition codes and other information necessary to correctly interpret the general instructions in the routine. As a matter of convention, the PSW for this routine, is stored in the subsequent memory address after the vector address provided by the peripheral device. Therefore, the control store 34 must issue instructions or μ-words to obtain the contents of both the vector address and the subsequent address in the external 16 memory. Accordingly, in the next μ-cycle, n+2, the bus address register 78 is loaded with the contents of the $R_n$ register of the A scratch pad 60 which contains the vector address. During this μ-cycle, the contents of the $R_n$ register are incremented by the ALU 66 and thereafter rewritten back into the $R_n$ register. The μ-word will also issue a Data In (DATI) command which will cause the contents in the address specified by the bus address register 78 to be coupled into the processor 12 on to the Din bus 22. Thereafter in the n+3 μ-cycle, the control store will issue a μ-word which causes the MD register to be written with the data presently on the Din bus. The data is of course the first address of the service routine to be executed and will subsequently be loaded into the program counter (PC) register in the scratch pad registers. The new processor status word will be fetched later on in the microroutine after other preliminary operations are performed.

Since the servicing of the peripheral is an interruption in the normal routine of the program, the processor must have a method of remembering the point in the program where it departed to service the peripheral device. Accordingly, two items (words) of information are required to be stored at this time so that the processor can correctly re-enter the program after completing the service routine. These two words are the address of the next instruction to be executed by the processor prior to the interruption by the service request and which is presently contained in the PC register in the scratch pads and the processor status word associated with the next instruction to be executed prior to interruption of the processor and which is located in the PSW register 52 in the processor control unit 32.

For this purpose of storing this type of information, a group of registers, commonly referred to as a stack, are reserved in the memory buffer unit 28 which are monitored by the stack pointer (SP) register in the scratch pad. Accordingly, the control store, in addition to retrieving the first address of the routine and a new processor status word must also load into the stack the old program count and the old processor status word. Thus, in the next μ-cycle, n+4, the control store issues a μ-word which specifies a secondary operation and the UCON register 42 is loaded. As depicted in FIG. 7, the secondary operation specified by this μ-word is the selection of the PSW register 52 in the processor control unit 32 for coupling to the Din bus 22. Accordingly, the select field of the UCON register 42 must specify selection of the processor unit 32 (i.e., the processor select bit must have a value of binary 1). In addition, the multiplexor enable field and status register select field in the control field of the UCON register 42 must enable the multiplexor 58 and select the processor status register 52 for coupling to the Din bus 22. It should also be noted at this time that the PSW register 52 has been conditioned in advance by the μ-word, to be written or loaded at a later point in the routine with the contents of the new processor status word as will be described in more detail hereinafter.

Returning once again to the routine illustrated in FIG. 7, a μ-word is issued from the control store 34 during the next μ-cycle, n+5, which causes the bus address register 78 to be loaded with the contents of the $R_n$ register in the scratch pad (which now contains the address of the new processor status word; the contents of the MD register (the new program count) to be transferred into the D register and then into the $R_n$ register of A scratch pad; and finally causes the data on the Din bus (the old PSW) to be transferred into the MD register. Additionally, this μ-word specifies a DATI operation which will cause the contents of the address in the bus address register (where the address of the new PSW is located) to be transferred on to the data bus 20 for coupling to the memory 16.

Since the μ-word issued by the control store 38 during this μ-cycle, n+5, specifies a DATI operation which requires a primary transfer over the Din bus 22, the D-cycle and IN/OUT bits in the bus control field of the μ-word will have values of binary 1 and 0 respectively. Thus, as earlier explained, the bus/box control circuitry 88 will issue a box multiplexor disable signal during the next μ-cycle, n+6, disabling all box multiplexors in the units of the processor and permitting the new PSW to be transferred into the data path 30 without interference from other sources such as, in this case, box multiplexor 58 which is currently selected and enabled by the UCON control circuit 42. In the next μ-cycle, n+6, the μ-word selected from control store 38 provides for a transfer of the contents in the MD register (the old processor status word) into the shift register 72 followed by the loading of the MD register with the data on the Din bus 22 which, in this case, is the new processor status word.

At this point in the microroutine, both the new and the old processor status words are stored in scratch pad registers in the data path 30. Before transferring the old processor status word into the stack, the PSW register 52 is loaded with the new processor status word. Accordingly, in the next μ-cycle, n+7, the μ-word selected from the control store 38 causes the D register to be written with the contents of the MD register (the new processor status word).

The next μ-word (n+8) in the microroutine specifies a secondary operation in which the PSW register 52 is loaded with the contents of the D register (ie, the new processor status word). As earlier explained, the selection of the PSW register 52 for receipt of the new processor status word via the Dout bus 24 was provided for when the UCON register 42 was loaded during the n+4 μ-cycle. However, this preselection has had no effect until the present μ-cycle since the secondary write bit of the intravening μ-word has not been enabled. In this μ-cycle, n+8, however, the secondary write bit of the μ-word bus control field has been enabled (ie, has a value of binary 1) thereby specifying a transfer from the D register 74 over the Dout bus 24 to the storage location and unit selected by the UCON register 42 which in this case, of course, is the PSW register 52 in the processor control unit 32. Additionally, the D register is loaded with the contents of the shift register 72, (ie, the old processor status word) during this μ-cycle.

It can be appreciated from the foregoing, that primary and secondary operations may occur during the same μ-cycle. In both the n+5 and n+8 μ-cycles in FIG. 7, a secondary or inter-unit transfer operation has been performed in the same μ-cycle with primary intra-unit operations within the data path. Moreover, both secondary transfers were controlled indirectly by the secondary μ-word issued by the control store 34 in the n+4 μ-cycle. However, as earlier noted, a primary operation in which a transfer of data over the Din or Dout busses, 22 and 24, is required cannot occur during the same μ-cycle as a secondary transfer operation in the preferred embodiment of the present invention depicted in FIG. 1.

At this point in the illustration depicted in FIG. 7, the new program count and the new processor status word have been retrieved from the extended memory 16, the old processor status word has been transferred from the PSW register 52 into the data path 30 and the new processor status word has been loaded into the PSW register 52. Therefore, all that remains prior to execution of the service routine, is the transfer of the old processor status word and the old program count into the stack. Accordingly, in the next μ-cycle, n+9, the μ-word issued by the control store 38 specifies that the contents of the stack pointer register located on the scratch pad, be retrieved, decremented and transferred into the shift register 72. As earlier noted, the stack pointer register monitors all entries to and retrievals from the stack and thus contains the address of the last entry on to the stack. This address then must be decremented to provide the address for the next entry into the stack.

In the next μ-cycle, n+10, the contents of the shift register are loaded into the bus address register 78. During this μ-cycle, the contents of the shift register (SR) 72 are decremented and returned to the shift register, thereby providing the address for the next entry into the stack. Additionally, a data out (DATO) command is initiated, thereby coupling the contents of the D register 74 (the old processor status word) onto the Dout bus 24 for transfer to the stack.

The transfer of the old processor status word to the address specified in the bus address register 78 is completed during the subsequent μ-cycle, n+11, and the contents of the SR 72 are transferred into the SP in the scratch pad. This is followed by a μ-word in the n+12 μ-cycle under the control of which the contents of the SR 72 are transferred to the bus address register 78 and the contents of the PC register in the scratch pad is transferred into the D register. This μ-word also specifies a DATO for coupling the contents of the D register (the old program count) onto the Dout bus 24 for transfer to the stack address in the bus address 78 during the next μ-cycle.

In the n+13 μ-cycle, the PC register in the scratch pad is loaded with the new program count as illustrated in FIG. 7 by retrieving the contents of the $R_n$ register in the scratch pad, transferring it into the D register 74, and thereafter into the PC register. At this point, the processor 12 is ready to begin execution of the service routine. The address of the first instruction of this routine is stored in the PC register and is loaded into the BA register as shown in the n+14 µ-cycle in FIG. 7. The addresses for subsequent instructions will be derived by incrementing the PC as explained in the aforementioned U.S. Patents. After completion of the service routine, the old program count and processor status word will be retrieved from the stack using the address in the stack pointer register in the scratch pad whereupon the processor will continue execution of the interrupted program from the point where the interruption occurred.

As earlier mentioned, optional units may be coupled to the processor 12 in the present embodiment. In particular, these optional units must communicate with other units of the processor in the same manner as described for the units of the processor depicted in FIG. 1. Each optional unit is coupled to the Din bus 22, the Dout bus 24 and the microbus register 38. Additionally, at least one multiplexor controlled by the UCON register 42 is included in each unit to conrol transfers of data between the optional unit and the data path 30. Additionally, each multiplexor will be disabled each time a primary D transfer over the Din bus 22 or Dout bus 24 is specified by the µ-word.

Two examples of such optional devices are: high-speed floating point processor, typically provided with processors of this nature to perform high-speed precision floating point arithmetic operations; and a writeable control store for storing programmed instructions written and modified by the user of the processor for controlling the processor 12 during special applications.

It can be appreciated therefore, that the present invention comprises a processor unit for a data processing system whcih is both a high performance and an economical machine. As described herein, operations performed by the processor control unit are classified as primay or secondary according to their frequency of occurrence. Primary operations are directly controlled by the µ-word for execution in the shortest time possible, whereas, secondary operations are controlled indirectly through the use of intermediate storage and decoding. As illustrated in FIG. 7, the primary operations or µ-words, which are issued frequently, are executed directly and rapidly whereas secondary operations or µ-words, although necessary for the overall operation and performance of the machine, occur infrequently enough so that an indirect, slower execution thereof has a minimal effect on the high-performance characteristics of the machine. Since the actual execution of a secondary instruction can take place at the same time that a primary instruction is being executed, it can be appreciated that the present invention allows the µ-word to be extended in fucntionality without expanding the word/length.

While the invention has been described in its preferred embodiment, it is to be understood that the words which have been used are words of description rather than limitation and that changes may be made within the perview of the appended claims without departing from the true scope and spirit of the invention in its broader aspects.

We claim:

1. A data processing system including a processor for fetching, interpreting and executing program instructions, said processor having a plurality of units, said processor comprising:
   at least one processor data bus comprised of at least one electrical conductor for transferring information between said units of the processor;
   control store means for storing a plurality of processor instructions used for controlling the transfer and manipulation of information by the processor and including second processor instructions used to control the transfer of information between the units of the processor over the processor data bus, said control store means having an output and said processor instructions including at least one control field;
   control store addressing means for periodically addressing certain ones of the processor instructions for causing the addressed processor instruction to be coupled to the output of said control store means;
   instruction transfer means coupled to the output of the control store means for transferring the addressed processor instructions throughout the processor;
   a plurality of logic means disposed throughout said processor and coupled to said instruction transfer means, each for controlling the operation of a unit of the processor in response to the addressed processor instruction;
   secondary control store means coupled to the processor instruction transfer means for storing portions of the secondary processor instructions addressed by the control store addressing means;
   a plurality of secondary logic means disposed throughout the processor and coupled to the secondary control store means for coupling certain units of the processor to said processor data bus in accordance with the contents of the secondary control store means.

2. The apparatus as described in claim 1 wherein the processor instructions include a secondary control field of information therein used to identify the secondary processor instructions and wherein the processor further includes secondary control store logic means coupled to the instruction transfer means and responsive to the secondary control field of selected processor instructions for controlling the storing of the portions of the secondary processor instructions in the secondary control store means.

3. The apparatus as described in claim 2 wherein each unit of the processor includes means responsive to the control field of the processor instructions for controlling the storage of information transferred over the processor data bus means by units of the processor coupled thereto, whereby the storage of information transferred on to the processor data bus may be controlled by a processor instruction addressed by the control store addressing means subsequent to the secondary processor instruction whose contents are stored in the secondary control store means at the time the information transferred on to the processor data bus is stored.

4. The apparatus as described in claim 3 wherein the processor instructions include a data bus control field for determining control of said processor data bus and wherein said processor further includes;
   data bus control means coupled to said processor instruction transfer means and responsive to said data bus control field of the addressed processor instruction, for generating a signal coupled to said secondary logic means for disabling said secondary logic means in response to the data bus control field of an addressed processor instruction;

whereby the transfer of information over the processor data bus means may be controlled by the selected processor instruction or the secondary control store means in accordance with the contents of said data bus control field in the addressed processor instruction.

5. In a data processing system including at least one peripheral device and a processor for processing information wherein said processor includes a plurality of units including a data path unit for performing arithmetic and logical manipulations of information, a control unit comprising a control store means for storing a plurality of processor instructions used to control the transfer and manipulation of information by the processor and including secondary processor instructions used to control the transfer of information between the data path unit and other units of the processor, said processor further comprising:

A. a first processor data bus having a plurality of electrical conductors for transferring information to the data path unit from other units of the processor and said peripheral device;

B. a second processor data bus having a plurality of electrical conductors for transferring information from the data path unit to other units of the processor and said peripheral device;

C. control store addressing means coupled to the control store means for periodically addressing certain ones of the processor instructions stored in said control stored means for causing said addressed processor instructions to be coupled to the output thereof said processor instructions including at least one control field;

D. instruction transfer means coupled to the output of the control store means for coupling the addressed processor instruction to the units of the processor;

E. primary unit logic means disposed in at least one of the units of the processor and coupled to the instruction transfer means for controlling the operation of the unit in response to the addressed processor instruction;

F. secondary control store means coupled to the instruction transfer means for storing portions of the secondary processor instructions addressed by the control store addressing means; and G. secondary unit logic means disposed in at least one of the units of the processor, including a unit having a primary unit logic means and responsive to said secondary control store means for controlling the transfer of information from said unit to the first processor data bus and the transfer of information from the second processor data bus to said unit.

6. The apparatus as described in claim 5 wherein the processor instructions include a bus control field for controlling the first and second processor data busses and wherein said processor further includes:

bus control means, having an input coupled to said instruction transfer means and an output coupled to the secondary unit logic means, said bus control means being responsive to the bus control field of the selected processor instruction for disabling the secondary unit logic means in response to the bus control field of a addressed processor instruction specifying a transfer of information over said first and second processor data busses between the data path unit and said peripheral device.

7. The apparatus as described in claim 6 wherein each unit of the processor includes at least one unit storage means for storing certain information which may be transmitted to or received from the data path unit.

8. The apparatus as described in claim 7 wherein the secondary unit logic means is comprised of:

A. at least one multiplexor means having an output coupled to the first processor data bus means and a plurality of inputs individually coupled to the unit storage means for coupling a selected one of the unit storage means to said first processor data bus means; and B. at least one gating means having an output coupled to a unit storage means and an input coupled to the second processor data bus means for coupling the information from said second processor data bus means to the unit storage means.

9. The apparatus as described in claim 8 wherein the information stored in said secondary control store means comprises two fields including:

A. a select field for selecting one of the units of the processor for transferring information with the data path unit; and B. a control field for selecting and controlling a multiplexor means and a gating means in the selected unit of the processor for coupling to the first and second processor data busses, respectively.

10. The apparatus as described in claim 9 wherein the control field of the processor instructions includes:

a unit bus write field coupled to each gating means in the units of the processor for controlling the storage of information received from the second processor data bus means in the selected unit storage means;

a data path bus write field coupled to the data path unit for controlling the storage therein of information received from the first processor data bus;

whereby the storage of information transferred over said first and second data busses is controlled by the addressed processor instruction such that said storage may be controlled by a processor instruction selected addressed by the control store addressing means subsequent to the addressing of the secondary processor instruction stored in the secondary control store means at the time information is stored in a unit storage means.

11. A processor control unit for connection to a processor having a plurality of units in a data processing system, said processor comprising a data path unit for performing arithmetic and logical manipulations of information, at least one processor data bus for transferring information between the data path unit and the processor control unit, a control store for storing a plurality of processor instructions for controlling the transfer and manipulation of information by the processor and including secondary processor instructions for controlling the transfer of information between the data path unit and the processor control unit, said processor instructions including at least one control field, means for periodically selecting certain ones of said stored processor instructions, and secondary control store means coupled to said control store means for storing portions of selected secondary processor instructions, said processor control unit comprising:

instruction transfer means coupled to said control store means for transferring the selected processor instructions throughout the processor having a plurality of units;

unit logic means coupled to said instruction transfer means for controlling the operation of the processor control unit in response to the selected processor instructions; and secondary unit logic means responsive to said secondary control store means for coupling certain units of the processor to the processor data bus for transmitting information to and receiving information from said data path unit over the processor data bus.

12. The apparatus as described in claim 11 where in said processor data bus comprises:
   A. a first processor data bus comprised of a plurality of electrical conductors for coupling information from said processor unit to the data path unit; and
   B. a second processor data bus comprised of a plurality of electrical conductors for coupling information from the data path unit to said processor unit.

13. The apparatus as described in claim 12 wherein said processor unit further comprises at least one unit storage means responsive to said secondary unit logic means for storing information to be transferred to the data path unit over said first processor data bus and received from the data path unit over said second processor data bus.

14. The apparatus as described in claim 13 wherein said secondary unit logic means comprises:
   A. at least one multiplexor means for controlling the transfer of information from the unit storage means to said first processor data bus; and
   B. at least one gating means for controlling the transfer of information from said second processor data bus to the unit storage means.

15. The apparatus as described in claim 14 wherein the information stored within said secondary control store means comprises:
   A. a select field for selecting a processor unit to communicate with the data path unit; and
   B. a control field for selecting at least one unit storage means in said selected processor unit and controlling the transfer of information to and from said selected storage means to the second and first processor data busses, respectively.

16. The apparatus as described in claim 15 wherein the control field of said processor instructions includes:
   a unit write field coupled to each gating means for controlling the storage of information from said second processor data bus in the selected unit storage means; and
   a data path unit write field coupled to the data path unit for controlling the storage of information from said first data processor bus in the data path unit;
   whereby the storage of information transferred on to said first and second processor data busses may take place under the control of a processor instruction selected from the control store means subsequent to a secondary processor instruction stored in said secondary control store means at the time of said storage.

17. The apparatus as described in claim 11 wherein said processor instruction includes a bus control field and said processor further includes a bus control means responsive to said bus control field of the processor instruction having an output coupled to the secondary unit logic means in the processor unit for disabling said secondary unit logic means when a selected processor instruction requires a transfer of information over said processor data bus under the control of the selected processor instruction.

* * * * *